United States Patent [19]

Takayama

[11] Patent Number: 5,341,473

[45] Date of Patent: Aug. 23, 1994

[54] SYSTEM OF TRANSFERRING DATA IN A MULTI-CPU ARRANGEMENT USING ADDRESS GENERATORS

[75] Inventor: Michio Takayama, Tokyo, Japan

[73] Assignee: NEC Corporation, Tokyo, Japan

[21] Appl. No.: 743,052

[22] Filed: Aug. 9, 1991

[30] Foreign Application Priority Data

Aug. 9, 1990 [JP] Japan ................................. 2-209221

[51] Int. Cl.$^5$ ........................... G06F 9/46; G06F 13/42
[52] U.S. Cl. .................................... 395/200; 364/229; 364/229.5; 364/230.1; 364/230.5; 364/239; 364/240; 364/240.8; 364/243.7; 364/244.8; 364/DIG. 1; 364/DIG. 2
[58] Field of Search ............... 395/800, 325, 725, 425, 395/400, 375, 500, 200, 275, 250, 775, 550; 364/DIG. 1, DIG. 2; 365/230.05

[56] References Cited

U.S. PATENT DOCUMENTS

| | | | |
|---|---|---|---|
| 4,805,137 | 2/1989 | Grant et al. | 395/325 |
| 5,014,247 | 5/1991 | Albachten, III et al. | 365/230.05 |
| 5,155,855 | 10/1992 | Masuo et al. | 395/725 |

Primary Examiner—Alyssa H. Bowler
Assistant Examiner—Daniel Pan
Attorney, Agent, or Firm—Sughrue, Mion, Zinn, Macpeak & Seas

[57] ABSTRACT

A system for transferring digital signals between at least two printed circuit boards (packages) provided within a digital signal processing apparatus and each mounting a plurality of electronic parts such as microprocessors between a CPU package and a peripheral control package. The CPU package has a microprocessor (CPU), a transmitting sequential address generator 1, a receiving sequential address generator circuit 1, a transmitting dual port RAM 1 and a receiving dual port RAM 1. The peripheral control package has a digital processing circuit, a transmitting sequential address generator 2, a receiving sequential address generator 2, a transmitting dual port RAM 2 and a receiving dual port RAM. When a control information is to be sent from the CPU to the digital processing circuit, the CPU is required to only write the control information in the transmitting dual port RAM. The control information is read out from the transmitting dual port RAM according to sequential addresses produced by the transmitting sequential address generator independently from the CPU and outputted to the receiving dual port RAM of the peripheral control package. The control information thus outputted is written in the receiving dual port RAM 2 according to addresses produced by the receiving sequential address generator 2. The digital processing circuit reads the control information from the receiving dual port RAM 2 and processes it in a manner predetermined. This is the same for a case where information is transferred from the digital processing circuit to the CPU.

15 Claims, 5 Drawing Sheets

FIG. 4
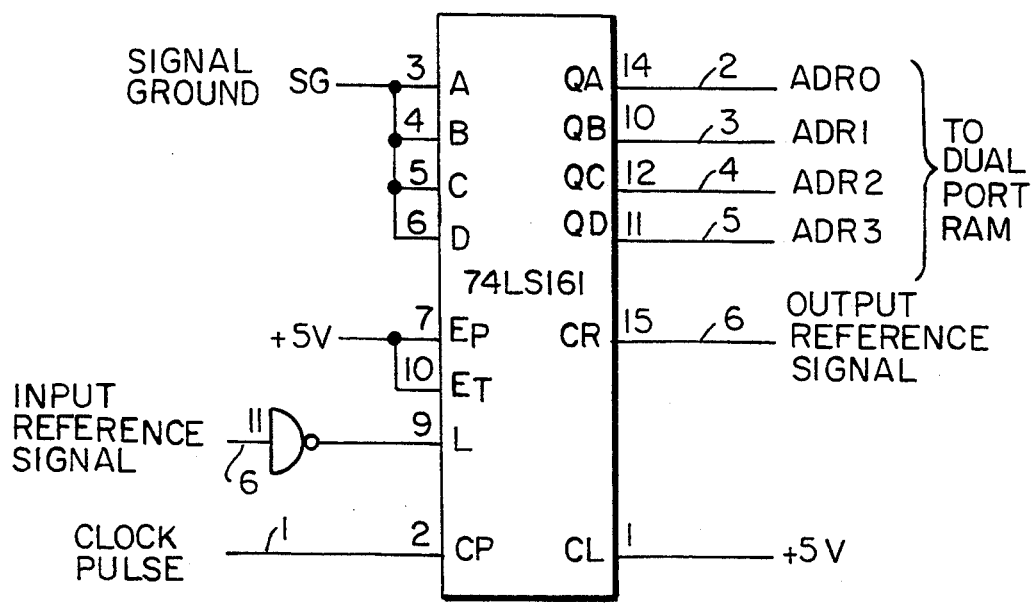
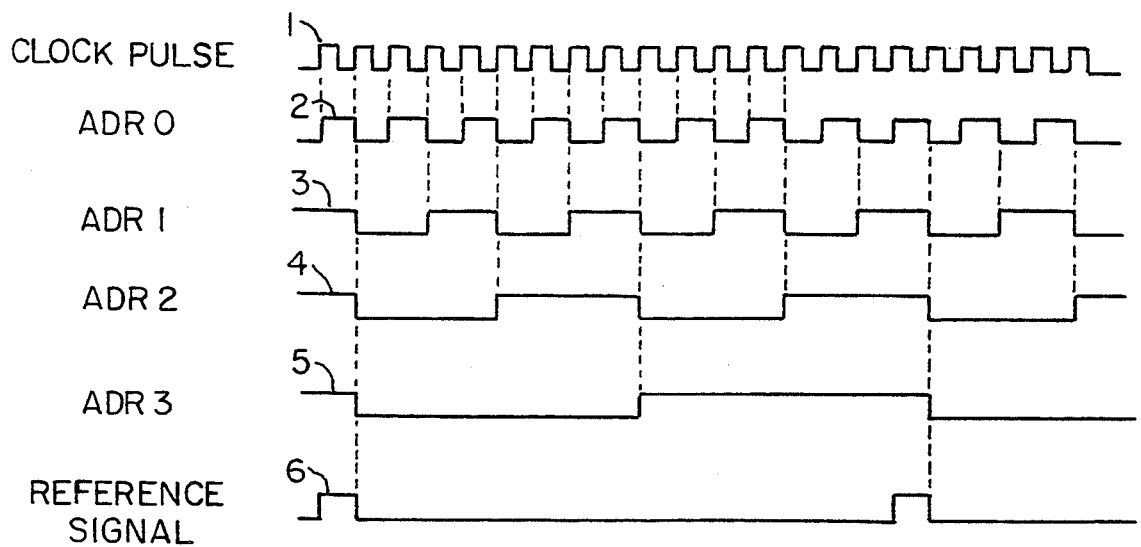
FIG. 6

SYSTEM OF TRANSFERRING DATA IN A MULTI-CPU ARRANGEMENT USING ADDRESS GENERATORS

BACKGROUND OF THE INVENTION

1. Field of the Invention

The present invention relates to a package to package data transmission system for transmitting digital signals between a plurality of printed circuit boards (referred to as "packages", hereinafter) on each of which a plurality of LSIs such as CPUs, memories and address generation circuits and other electronic parts are mounted, and, particularly, to a data transmission system for transmitting digital data between a CPU package and a peripheral control package performing data transmission and reception.

2. Description of the Prior Art

In an information processing apparatus having hardware and software whose functions are being improved, a distributed processing system using microprocessor (CPU) has been employed in order to realize required improvement of functions thereof efficiently and economically. In general, such distributed processing system is constituted with a central processing unit for controlling a whole system and a peripheral processing unit for controlling respective peripheral functions. CPUs used in the central processing unit and the peripheral processing unit are being improved functionally with an increase of bit number, such as from 4-bit model to 8-bit model, to 16-bit model and to 32-bit model.

Each of such central processing unit and peripheral processing unit is constituted, generally, with a CPU package for controlling a whole function of the unit and a plurality of peripheral control packages for performing peripheral control functions under control of the CPU package. Of course, each peripheral control package may include a CPU according to a desired function or functions.

A data transfer between the CPU package and the peripheral control packages is an important design parameter since it affects service functions available by the system, performance of the system and the number of packages.

An example of conventional data transmission of this type is to change transmission rate of a channel interface of a data transmission device, such as RS-232C interface, according to specific applications. In such conventional method, since an amount of control information is small, a CPU and an I/O port are mounted on the CPU package, memories and data transmission devices are mounted on the peripheral control packages, such that the transmission rate of the data transmission device is set by polling it from the CPU through the I/O port and the memories.

As another conventional method, a setting of TSI (Time Slot Interchange) in a time division multiplexer which is one of the data transmission device is changed according to applications. Since the control of TSI is to assign time slots each of several tens Mbps for respective transmission routes, it is necessary to set a large amount of information within a short time. In this method, the CPU package mounts a CPU for operating setting locations of the time slots and the peripheral control packages mount shared memories, CPUs for performing controls according to operation information and handshaking registers through which the respective CPUs conflict in getting right of control to transmit data through the shared memories.

In the first example mentioned, a CPU having control right has to determine, prior to a data transmission, whether or not a destination apparatus is available for data reception. On the other hand, in the second example, there is always conflict in getting control right between CPUs of a transmitting apparatus and a receiving apparatus. In either of these conventional systems, a CPU having control right is used for transmitting processing until a data transmission completes and therefore a load on the CPU side is increased. Particularly, when an amount of data is large or there are a plurality of peripheral control packages in the destination apparatus, increase of load becomes considerable. Further, since the data transmission is performed by the CPU on data by data basis, it takes a long time to complete transmission. In addition, since, in the conventional systems, each data is transmitted only once, it is very difficult to detect, in the CPU, a data error which occurs externally in the destination apparatus due to occurrences such as lightning. Such data error becomes a very large problem in a data transmission apparatus which is to be run continuously for 24 hours.

BRIEF SUMMARY OF THE INVENTION

Object of the Invention

An object of the present invention is to provide a package to package data transmission system with reduced load on the CPU.

Another object of the present invention is to provide a data transmission system of this type in which data transfer efficiency is improved.

A further object of the present invention is to provide a data transmission system of this type by which data transfer error is easily detected.

A still further object of the present invention is to provide a data transmission system of this type in which error recovery is facilitated even when data error occurs.

Summary of the Invention

A package to package data transmission system of the invention comprises a CPU package and a peripheral control package. A CPU in the CPU package provides an address signal and a write control signal to request a data write and, responsive to an interrupt signal, provides an address signal and a data read control signal to request a data read. The CPU package comprises a sequential address generator for transmission. This address generator outputs a reference signal to a first package-to-package line at a period determined independently from the CPU and outputs a write control signal and an address signal increasing sequentially from 0 every time the reference signal is provided. The CPU package further comprises a sequential address generator for receiving, which outputs a reference signal to a second package-to-package line at a period determined independently from the CPU and outputs a read control signal and an address signal increasing sequentially from 0 every time the reference signal is provided. Further, the CPU package includes a dual port RAM for transmission, which responds to data, address and write control signals from the CPU to write data in an internal memory, responds to address and read control signals from the transmitting sequential address generator to output data from the internal memory to a third package-to-package line. The CPU package further includes a dual port RAM for receiving, which responds to address and read control signal from the CPU to read data from the internal memory to the CPU, responds to address and write control signal from the receiving address generator to write data received from a fourth package-to-package line in the internal memory during reception of write enable signal. The CPU package further comprises a data validity decision circuit which uses the cyclically updated address information from the receiving address generator to monitor a validity information bit in a specific address in data from the fourth package-to-package line and, if the information bit is valid, outputs a write enable signal to the receiving RAM and then an interrupt signal to the CPU.

The CPU of the peripheral control package in the data transmission system of the invention outputs an address signal and a write control signal to request a data write and, responsive to an interrupt signal, outputs an address signal and a read control signal to request a data read. The peripheral control package further includes a transmitting sequential address generator which, independently from the CPU, outputs a write control signal and an address signal increasing sequentially from 0 every time the reference signal is received from the second package to package line. Further, the CPU package includes a receiving sequential address generator which, independently from the CPU, outputs a write control signal and an address signal increasing sequentially from 0 every time the reference signal is received from the first package-to-package line. The peripheral control package further includes a receiving dual port RAM which responds to address and write control signals from the receiving address generator to write data received from the third package-to-package line in the internal memory during reception of the write enable signal and responds to the address and read control signals from the CPU to read data from the internal memory and output it to the CPU. Similarly, the peripheral control package includes a transmitting dual port RAM which responds to data, address and write control signals from the CPU to write data in the internal memory, receive the address and read control signals from the transmitting sequential address generator circuit and output data from the internal memory to the fourth package-to-package line. The peripheral control package further comprises a data validity decision circuit which uses the cyclically updated the address signal from the receiving address generator to monitor a information bit in a specific address in data from the third package-to-package line and, if the information bit is valid, outputs a write enable signal to the receiving dual port RAM and then an interrupt signal to the CPU.

The dual port RAM used herein may be formed of a RAM having two sets of mutually independent data bus, address bus and control ports for read and write (R/W) operations and including a conflict control function therein, which is commercially available or may be constituted by adding some circuit to a commercially available single port RAM.

The package to package data transmission system of the invention reduces load on CPU. Further since it employs a RAM to RAM data transmission, the data transmission efficiency is improved. Further, by monitoring data transmission cyclically, a detection of data transmission error can be easily performed and, due to the cyclic data transmission, even if a data error occurs, it can be recovered in the next data transmission cycle.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIG. 4 is a detail of a sequential address generator shown in FIGS. 1 and 2;

FIGS. 6 and 7 show waveforms for explaining a sequential address generator and a data validity decision circuit, respectively.

DETAILED DESCRIPTION OF THE PREFERRED EMBODIMENTS

Figure 1:
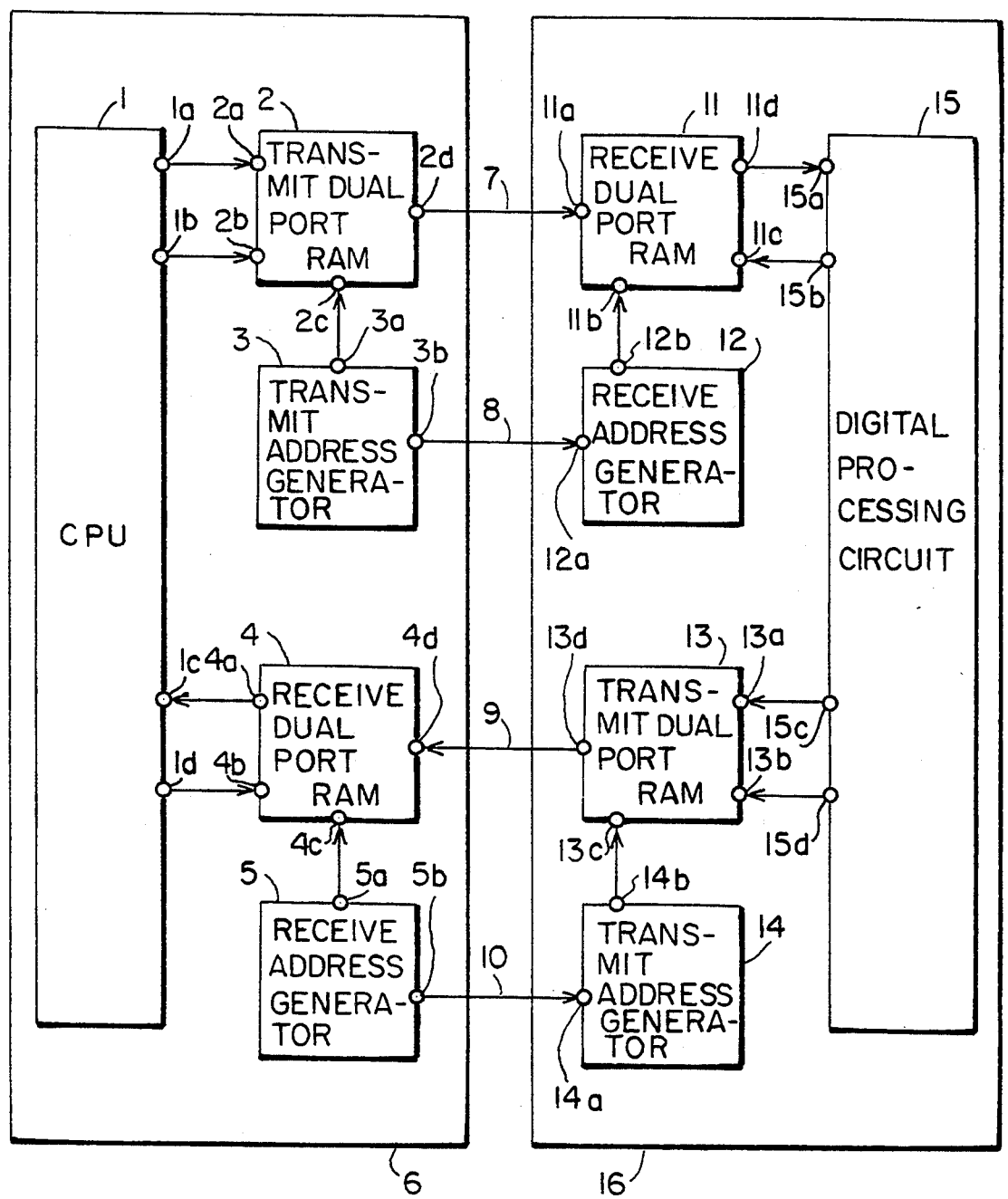
FIG. 1 is a block diagram of an embodiment of a package to package data transmission system according to the present invention.

Referring to FIG. 1, a first embodiment of the present invention comprises a CPU package 6 and a peripheral control package 16 implementing data transmission and reception with peripheral devices under control of the CPU package 6.

A CPU 1 mounted on the CPU package 6 has a port 1a from which data is transmitted to a transmitting dual port RAM 2 and a port 1b from which an address signal and a write control signal are outputted. The CPU 1 has a port 1d from which the address signal and a read control signal are outputted to a receiving dual port RAM 4 and a port 1c in which data is received.

Similarly, a transmitting dual port RAM 2 has a port 2a for receiving data and a port 2b for receiving the address signal and a write control signal from the CPU 1, respectively, to write data in an internal memory. The RAM 2 also has a port 2c for receiving an address signal and a read control signal from a transmitting sequential address generator 3 to read data from the internal memory and to output it from its port 2d onto a line 7.

Similarly, the transmitting address generator 3 outputs a reference signal from its port 3b to a line 8 at a period determined independently from the CPU 1 and outputs a read control signal and an address signal which is increased sequentially from 0 from its port 3a to the RAM 2 every time a reference signal is outputted.

The receiving dual port RAM 4 receives at its port 4c an address signal and a write control signal from a receiving sequential address generator 5 and at its port 4d data from a line 9 and write them in the internal memory. The receiving RAM 4 receives at its port 4b the address signal and read control signal from the CPU 1 and reads data from the internal memory and outputs it from its port 4a to the CPU 1.

The receiving address generator 5 outputs a reference signal from its port 5b to a line 10 at a period determined independently from the CPU 1 and outputs a read control signal and an address signal which is increased sequentially from 0 from its port 5a to the receiving RAM 4 every time a reference signal is outputted.

On the other hand, a receiving dual port RAM 11 included in the peripheral control package 16 receives at its port 11b an address signal and a write control signal from a receiving sequential address generator 12 and writes data received at its port 11a from the line 7 in an internal memory. Further, the RAM 11 receives at its port 11c an address signal and a read control signal from a digital processing circuit 15 in the package and reads data from the internal memory and outputs it from its port 11d to the digital processing circuit 15. The receiving address generator 12 is independent from the digital processing circuit 15 and outputs a write control signal and an address signal sequentially increasing from 0 from its port 12b to the RAM 11 every time it receives a reference signal at its port 12a from the line 8.

The RAM 13 receives at its port 13b an address signal and a write control signal from the digital processing circuit 15 and at its port 13a data and writes it in the internal memory. The RAM 13 further receives at its port 13c an address signal and a read control signal from the transmitting address generator 14 and reads data from the internal memory and outputs it from a line 9.

The transmitting address generator 14 outputs from its port 14b to the transmitting RAM 13 a write control signal and an address signal increasing sequentially from 0 every time it receives at its port 14a a reference signal from a line 10.

The digital processing circuit 15 included in the package outputs an address signal and a read control signal from its port 15b to the receiving RAM 11 and receives at its port 15a data from the receiving RAM 11. Further, the digital processing circuit 15 outputs at its port 15d an address signal and a write control signal to the transmitting RAM 13 and at its port 15c data.

An operation of the first embodiment will be described.

It is assumed that the CPU package 6 is instructed by an upper device (not shown) to set a transmission rate to 9.6 kbps, that instruction parameters are transmitted to the peripheral control package 16 and that the digital processing circuit 15 which has a data transmission function with the RS-232C interface within the peripheral package is set to a transmission rate of 9.6 kbps.

The parameters digitally processed by the CPU 1 are written in memory addresses of the transmitting RAM 2, which are predetermined by the CPU 1. Parameters written in the transmitting RAM 2 are read out according to the address signal produced by the transmitting address generator 3 independently from the CPU 1 and sent through the data line 7 to the peripheral package 16.

In order to properly receive the parameters in the peripheral control package 16, the transmitting address generator 3 outputs the reference signal. This reference signal is inputted through the data line 8 to the receiving address generator 12 of the peripheral control package 16.

The receiving address generator 12 responds to the reference signal thus inputted and outputs the address signal and write control signal to the receiving RAM 11.

The receiving RAM 11 writes the inputted parameters in the internal memory according to the address information and write control signal. Since these parameters are written in the predetermined memory addresses, the digital processing circuit 15 in the package reads them when necessary and sets the transmission rate to 9.6 kbps.

Now, it will be considered a case where the CPU 1 reads out a control status in the data transmission operation with the RS-232C interface in the digital processing circuit 15.

The control status is written in a predetermined memory address of the transmitting RAM 13 by means of the digital processing circuit 15 and read out according to the address signal from the transmitting address generator 14 which operates independently from the processing circuit 15 and supplied to the data line 9. At this time, the transmitting address generator 14 outputs the sequential address in synchronism with the reference signal received thereby from the receiving address generator 5 through the data line 10.

The status information sent to the CPU package 6 is written in a predetermined memory address of the receiving RAM 4 according to the address signal from the receiving address generator 5.

The CPU 1 can read the written status information from the receiving RAM 4 on demand and digitally process it as required.

In this case, the digital processing circuit 15 in the package can be realized with a usual CPU. Further, the transmitting address generator 14 receives the reference signal from the receiving address generator 5 through the data line 10. However, the direction of the reference signal flow may be reversed.

Figure 2:
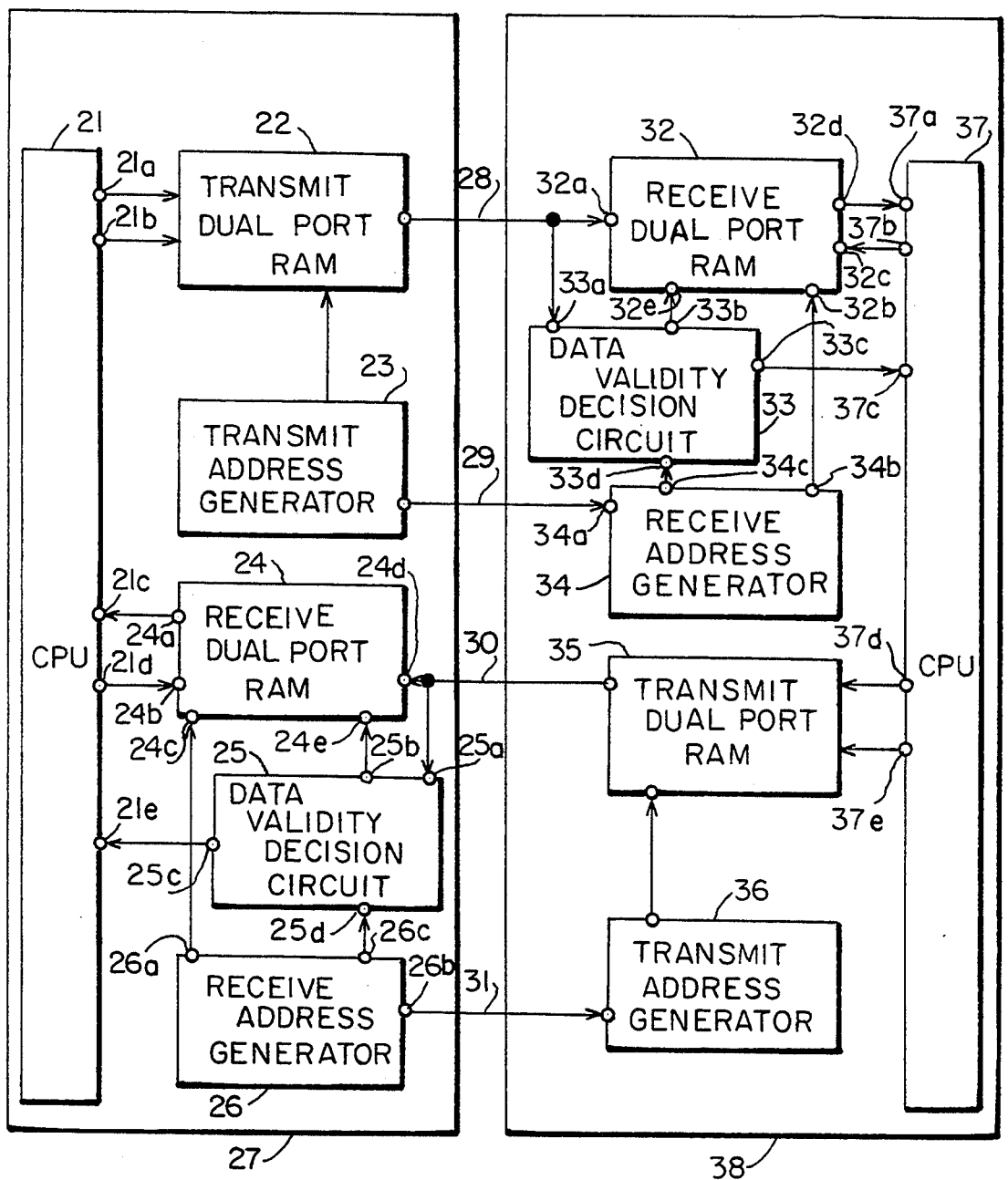
FIG. 2 is a block diagram of another embodiment of the package to package data transmission system according to the present invention.

Referring to FIG. 2, a second embodiment of the present invention comprises a CPU package 27 and a peripheral control package 38 implementing data transmission and reception with peripheral devices under control of the CPU package 27.

In the second embodiment, a CPU 21, a transmitting dual port RAM 22, a transmitting sequential address generator 23, a transmitting dual port RAM 35 and a transmitting sequential address generator 36 are identical to the CPU 1, the transmitting dual port RAM 2, the transmitting sequential address generator 3, the transmitting dual port RAM 13 and the transmitting sequential address generator 14 of the first embodiment shown in FIG. 1, respectively. Therefore, detailed description thereof is omitted.

The receiving RAM 32 mounted on the peripheral control package 38 receives at its port 32b an address signal and a write control signal from the receiving address generator 34 and, only when it receives at its port 32e a write enable control signal from a data validity decision circuit 33, it writes data received at its port 32a from a data line 28 in an internal memory. Further, the receiving RAM 32 receives at its port 32c an address signal and a read control signal from a CPU 37, reads the data from the internal memory and outputs it from its port 32d to the CPU 37.

A data validity decision circuit 33 uses cyclically updated the address signal received at its port 33d from the receiving address generator 34 to monitor a validity information bit of a specific address in a data from a data line 28 received at its port 33a. If the information bit is valid, a write enable signal is outputted from the port 33b to the receiving RAM 32 and then an interrupt signal is outputted from the port 33c to the CPU 37.

The receiving address generator 34 outputs a write control signal and address signal which is increasing sequentially from 0 from the port 34b to the receiving RAM 32 independently from the CPU 37 every time a reference signal is received at its port 34a from the data line 29 and outputs the same address from the port 34c to the data validity decision circuit 33.

When the CPU 37 receives the interrupt signal at its port 37c from the data validity decision circuit 33 it outputs an address signal and a read control signal at its port 37b to the receiving RAM 32 and receives at its port 37a the data.

The receiving RAM 24 included in the CPU package 27 receives at its port 24c an address signal and write control signal from the receiving address generator 26 and writes data received at its port 24d from the data line 30 in the internal memory only when it receives at its port 24e a write enable signal from the data validity decision circuit 25. The RAM 24 receives at its port 24b an address signal and a read control signal from the CPU 21 and reads data from the internal memory and outputs it at its port 24a to the CPU 21.

The data validity decision circuit 25 uses the address received at its port 25d from the receiving address generator circuit 26, which is cyclically updated, to monitor the validity information bit in a specific address of the data received at its port 25a from the data line 30. If the validity information bit is valid, it provides at its port 25b a write enable signal to the receiving RAM 24 and then outputs at its port 25c an interrupt signal to the CPU 21.

The receiving address generator 26 outputs at its port 26a a write control signal and an address signal which is sequentially increased from 0 to the receiving RAM 24 every time it outputs at its port 26b a reference signal to a data line 31, independently from the CPU 21, and simultaneously outputs at its port 26c the same address to the data validity decision circuit 25.

When the CPU 21 receives at its port 21e the interrupt signal from the data validity decision circuit 25, it outputs at its port 21d an address and write control signal to the RAM 24 and receives at its port 21c data.

Now, an operation of the second embodiment will be described.

It is assumed that the CPU package 27 is instructed by an upper device (not shown) to change the setting of TSI (Time Slot Interchange) of a time division multiplexer (TDM), a time slot assign change data is transferred to the peripheral control package 38 so that the TSI setting of the TDM in the peripheral control package 38 is changed and set to a new time slot assign.

The time slot assign change data digitally processed by the CPU 21 is written thereby in a predetermined memory address within the transmitting RAM 22 and validity information indicating that the time slot assign change data is valid is also written in another predetermined memory address.

The information written in the RAM 22 is read out with the address signal produced by the transmitting address generator 23 independently from the CPU 21 and sent to the peripheral control package 38 through the data line 28.

In order to properly receive the parameters in the peripheral control package 38, the address generator 23 outputs the reference signal. This reference signal is inputted through the data line 29 to the receiving address generator 34 of the peripheral control package 38.

The address generator 34 responds to the reference signal thus inputted and outputs the address signal to the data validity decision circuit 33 and the address signal and write control signal to the receiving RAM 32.

The data validity decision circuit 33 decides the validity information written in the predetermined memory address as valid according to the data transmitted and outputs a write enable signal to the receiving dual port RAM 32. The RAM 32 writes a time slot assign change data transmitted to the predetermined memory address while receiving the write enable signal from the data validity decision circuit 33. At a time when the time slot assign change data is written in the RAM 32, an interrupt signal is outputted by the circuit 33 to the CPU 37. After the CPU 37 receives the interrupt signal from the circuit 33, the CPU 37 outputs an address signal and a read control signal to a predetermined memory address to the RAM 32, reads the time slot assign change data and changes the TSI setting.

It is now assumed that the CPU 21 reads the TSI setting information under execution by the peripheral control package 38 and confirms the content thereof. The TSI setting information is written by the CPU 37 in a predetermined memory address of the transmitting RAM 35 and a validity information indicating that this information is valid is written in another predetermined memory address. The information written in the RAM 35 is read out with the address signal sent from the transmitting address generator 36 which operates independently from the CPU 37 and outputted to the data line 30. At this time, the address generator 36 outputs sequentially the address signal in synchronism with the reference signal received from the receiving address generator 26 through the data line 31.

The TSI setting information is written in the receiving RAM 24 by using the address signal and the write control signal from the receiving address generator 26, while the write enable signal produced by the data validity decision circuit 25 according to information sent to the CPU package 27.

At a time when the TSI setting information is written in the receiving RAM 24, the data validity decision circuit 25 outputs an interrupt signal to the CPU 21.

After the CPU 21 receives the interrupt signal, the CPU 21 can read the TSI information from the predetermined memory address of the receiving RAM 24 and confirm the content thereof.

In this case, the same can be realized by not the CPU 37 but a usual digital processing circuit within the package. Although the transmitting address generator 36 receives the reference signal from the receiving address generator 26 through the data line 31, a reversed construction may be used with the same effect.

Figure 3:
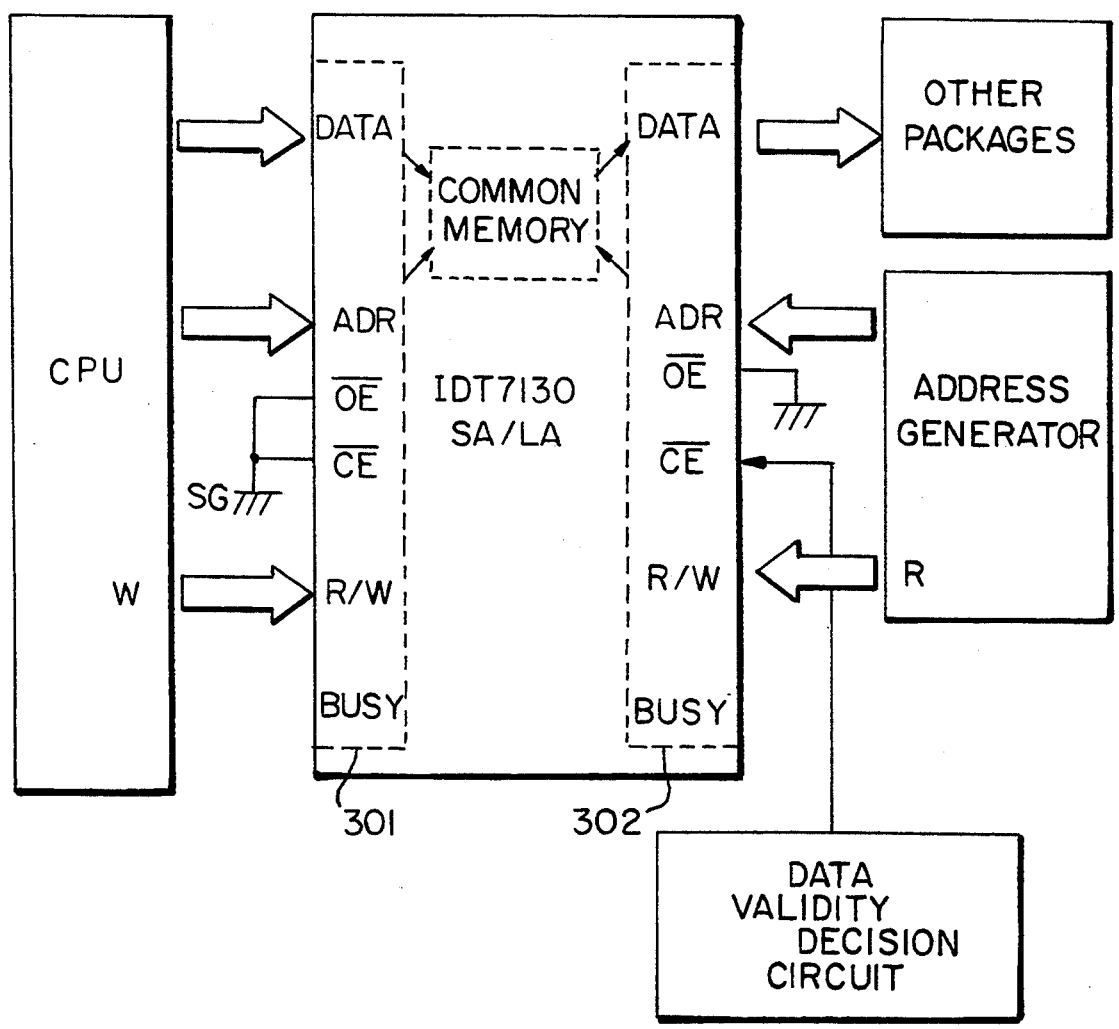
FIG. 3 is a detail of a dual port RAM shown in FIGS. 1 and 2.

FIG. 3 shows another embodiment in which the transmitting and the receiving dual port RAMs used in the embodiments shown in FIGS. 1 and 2 are replaced by commercially available IDT7130SA/LA.

The IDT7130SA/LA has ports 301 and 302 each including input terminals Address, Data, $\overline{OE}$ (Output Enable), $\overline{CE}$ (Chip Enable), R/W (Read Write assign) and Busy. When low level signals are supplied to the $\overline{OE}$ terminals and the $\overline{CE}$ terminals of these ports, the latter ports can perform write operations into an internal common RAM and read operation out from the RAM asynchronously using the Address terminals and the Data terminals thereof.

FIG. 3 shows an example where the port 301 is used by the CPU and the port 302 is used by the sequential address generator circuit and the data validity decision circuit. The write enable signal to be supplied from the data validity decision circuit to the receiving RAM is produced by supplying a low signal to the $\overline{CE}$ terminal. A conflict control of the CPU and the sequential address generator with respect to the common RAM is usually performed by using busy signal. Meanwhile, when the CPU and the sequential address generator access the common RAM, it is possible to input R/W signal by preliminarily using a high portion of a clock in one of them and a low portion thereof in the other.

FIG. 4 shows the transmitting and receiving sequential address generator shown in FIGS. 1 and 2 constituted with commercially available 74LS161 ICs, and FIG. 6 shows waveforms for explaining the address generators. When a clock pulse is inputted to a CP terminal thereof, frequency stepped-up clocks are derived from QA, QB, QC and QD terminals thereof, which are supplied to the address terminal of the RAM. When terminals A, B, C and D thereof are grounded to SG (Signal Ground), a reference signal is outputted at a terminal CR, which is obtained by stepping up frequency of an upper address signal of the QD, and further clocks synchronized with the reference signal supplied from a terminal L are outputted from the respective terminals QA, QB, QC and QD.

Figure 5:
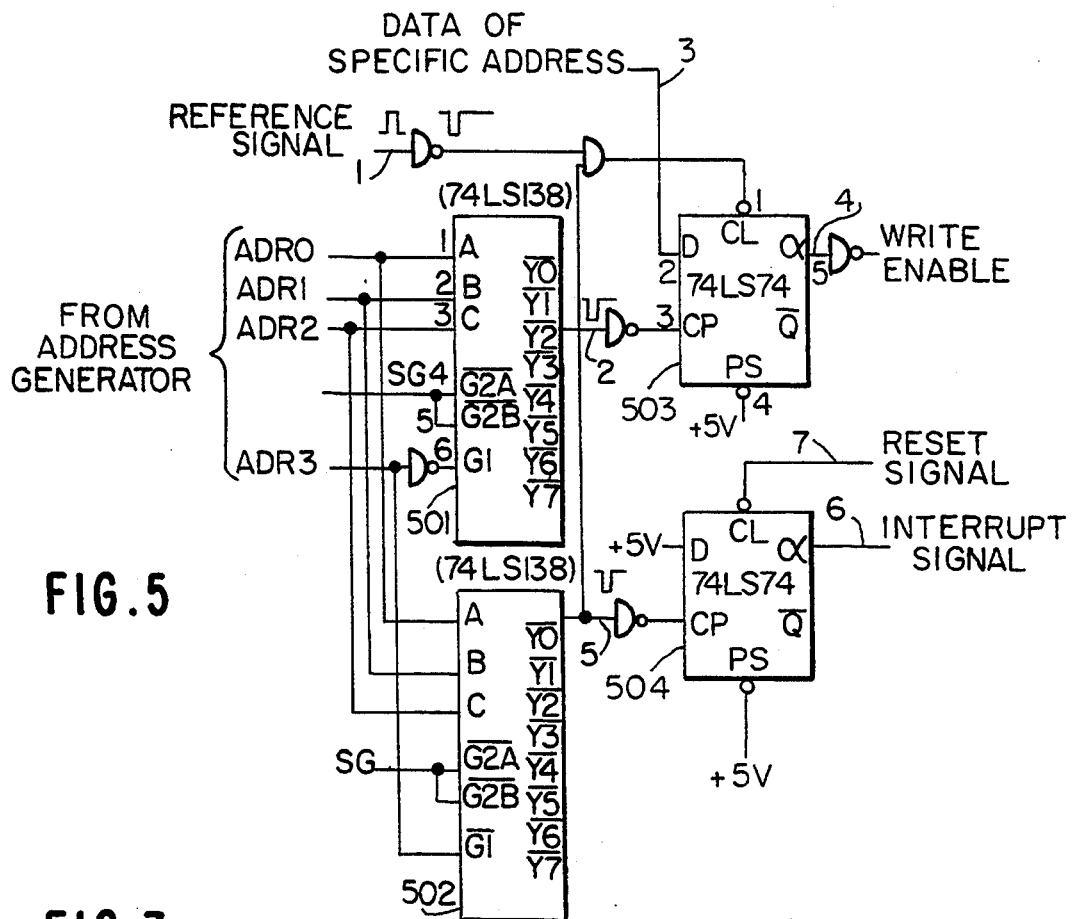
FIG. 5 shows an example of a data validity decision circuit shown in FIG. 2.
Figure 7:
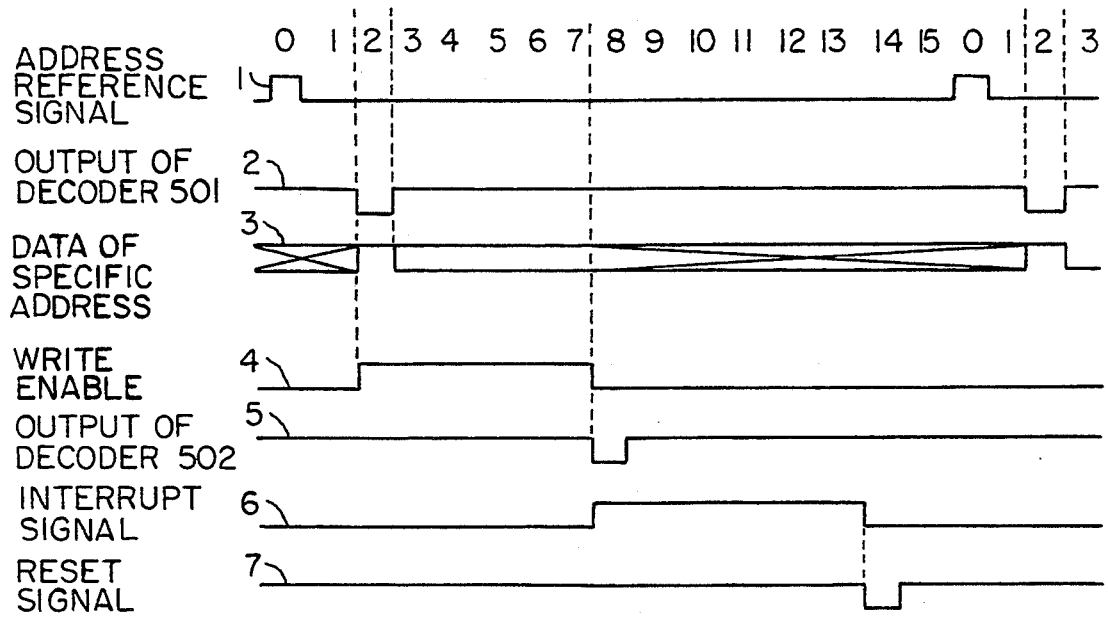

FIG. 5 shows an example in which the data validity decision circuit 33 (or 25) shown in FIG. 2 is realized by means of a commercially available IC, and FIG. 7 shows waveforms for explaining the decision circuit.

Addresses ADR0, ADR1, ADR2 and ADR3 from the address generator circuit are supplied to terminals A, B, C and G1 of a couple of decoders 501 and 502 constituted with 74LS138's. In this case, an inverted ADR3 is supplied to the decoder 501. The decoder 501 is connected at its terminal, for example, $\overline{Y2}$ to a terminal CP of a latch 503 constituted with a 74LS74. The same data as that of the transmitting RAM (22 or 35) is inputted to a terminal D of the latch 503. In this example, a valid information bit is latched thereby when the output at the terminal $\overline{Y2}$ is a low level (address is 2). When the validity information bit is 1, a write enable signal is outputted at the terminal Q of the latch 503 and supplied to the RAM.

On the other hand, when the output $\overline{Y0}$ of the decoder 502 is a low level indicating that the address is 8, the latch 503 is reset and the write enable signal disappears. Further, a high level at the terminal D of the latch 504 is latched and it is notified at the terminal Q to the CPU. The latch 504 is reset when it receives a release signal from the CPU at its terminal CL.

As is clear from the first and second embodiments described hereinbefore, the effects of the present invention can be summarized as follows:

(1) A load on the CPU in transmitting information is reduced since it is enough for the CPU to set data transmission of in the transmitting RAM.

For example,

① Time necessary CPU to transmit data of 1 byte through an I/O port in the conventional system:

Address set time to the I/O port + output from a register to the I/O port

= register, immediate instruction + outregister, accumulate instruction

= 10 (clock) + EA + 8 (clock) = 18 (clock) + EA

② Time necessary to set the same in the transmitting RAM in the present invention:

Write time from register to memory

= mov memory, accumulate instruction

= 8 (clock)

Therefore, according to the present invention, for each processing, time load is reduced by $$18 + EA - 8 = 10 \text{ (clock)} + EA$$

where EA is a value of time required to calculate an execution address in addition to pure execution time, expressed in term of the number of clock cycles.

(2) Data transmission efficiency is improved since data transmission between packages is performed between a transmitting and a receiving RAM according to sequential addresses produced by address generator independent from the CPU.

(3) Detection of transmission error is facilitated since it is judged by CPU by using an interrupt function to CPU when the data validity decision circuit decides that a validity information bit is on.

(4) Recovery of error is facilitated even if an data error occurs, since same data are transmitted cyclically.

Although the present invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A package to package data transmission system for transmitting digital data between at least two printed circuit boards or packages provided within a digital signal processing apparatus and mounting respectively thereon a plurality of electronic parts such as microprocessors, comprising:

(1) a first package including: a first microprocessor for providing a first address, a first data and a first write instruction; a transmitting sequential address generator for producing a timing reference signal having a predetermined period and generating and providing a second address and a second read instruction at a timing predetermined on the basis of said timing reference signal; and a transmitting dual port RAM responsive to said first address, said first data and said first write instruction for writing said first data in an area of a first memory area assigned by said first address and responsive to said second address and said second read instruction for outputting a second data in an area of said first memory area assigned by said second address; and (2) a second package including: a second microprocessor for providing a third address and a third read instruction; a receiving sequential address generator responsive to said timing reference signal for generating and providing a fourth address and a fourth write instruction at a timing predetermined on the basis of said timing reference signal; and a receiving dual port RAM responsive to said fourth address, said second data and said fourth write instruction for writing said second data in an area of a second memory area assigned by said fourth address and responsive to said third address and said third read instruction for outputting a third data in an area of said second memory area assigned by said third address.

2. The package to package data transmission system claimed in claim 1, wherein said second package comprises: said second microprocessor responsive to an interrupt signal for outputting said third address and said third read instruction; said receiving sequential address generator circuit responsive to said timing reference signal for outputting a fourth address and a fourth write instruction at a timing based on said reference signal; a data validity decision circuit for deciding in synchronism with said fourth address a validity of said second data in a predetermined address and outputting said write enable signal and said interrupt signal when valid; and a receiving dual port RAM responsive to said fourth address, said second data, said fourth write instruction and said write enable signal for writing said second data in an area of a second memory area assigned by said fourth address and responsive to said third address and said third read instruction for outputting a third data in an area of said second memory area assigned by said third address.

3. The package to package data transmission system claimed in claim 2, wherein said data validity decision circuit comprises means responsive to an instruction from said second microprocessor for stopping an output of said interrupt signal.

4. A package to package data transmission system for transferring digital data between at least two printed circuit boards or packages provided within a digital signal processing apparatus and mounting respectively thereon a plurality of electronic parts such as microprocessors, comprising:
 (1) a first package including: a microprocessor for providing a first address, a first data and a first write instruction; a transmitting sequential address generator for producing a timing reference signal having a predetermined period and generating and providing a second address and a second read instruction at a timing predetermined on the basis of said timing reference signal; and a transmitting dual port RAM responsive to said first address, said first data and said first write instruction for writing said first data in an area of a first memory area assigned by said first address and responsive to said second address and said second read instruction for outputting a second data in an area of said first memory area assigned by said second address; and
 (2) a second package including: a digital processing circuit for providing a third address and a third read instruction; a receiving sequential address generator responsive to said timing reference signal for generating and providing a fourth address and a fourth write instruction at a timing predetermined on the basis of said timing reference signal; and a receiving dual port RAM responsive to said fourth address, said second data and said fourth write instruction for writing said second data in an area of a second memory area assigned by said fourth address and responsive to said third address and said third read instruction for outputting a third data in an area of said second memory area assigned by said third address.

5. The package to package data transmission system claimed in claim 4, wherein said second package comprises: said digital processing circuit responsive to an interrupt signal for outputting said third address and said third read instruction; said receiving sequential address generator circuit responsive to said timing reference signal for outputting a fourth address and a fourth write instruction at a timing based on said reference signal; a data validity decision circuit for deciding in synchronism with said fourth address a validity of said second data in a predetermined address and outputting said write enable signal and said interrupt signal when valid; and a receiving dual port RAM responsive to said fourth address, said second data, said fourth write instruction and said write enable signal for writing said second data in an area of a second memory area assigned by said fourth address and responsive to said third address and said third read instruction for outputting a third data in an area of said second memory area assigned by said third address.

6. The package to package data transmission system claimed in claim 5, wherein said data validity decision circuit comprises means responsive to an instruction from said digital processing circuit for stopping an output of said interrupt signal.

7. A package to package data transmission system for transferring digital data between at least two printed circuit boards or packages provided within a digital signal processing apparatus and mounting respectively thereon a plurality of electronic parts such as microprocessors, comprising:
 (1) a first package including: a first microprocessor for providing a first address, a first data and a first write instruction; a transmitting sequential address generator responsive to a timing reference signal for generating and providing a second address and a second read instruction at a timing predetermined on the basis of said timing reference signal; and a transmitting dual port RAM responsive to said first address, said first data and said first write instruction for writing said first data in an area of a first memory area assigned by said first address and responsive to said second address and said second read instruction for outputting a second data in an area of said first memory area assigned by said second address; and
 (2) a second package including: a second microprocessor for providing a third address and a third read instruction; a receiving sequential address generator circuit for providing a timing reference signal having a predetermined period and generating and providing a fourth address and a fourth write instruction at a timing predetermined on the basis of said timing reference signal; and a receiving dual port RAM responsive to said fourth address, said second data and said fourth write instruction for writing said second data in an area of a second memory area assigned by said fourth address and responsive to said third address and said third read instruction for outputting a third data in an area of said second memory area assigned by said third address.

8. The package to package data transmission system claimed in claim 7, wherein said second package comprises: said second microprocessor responsive to an interrupt signal for outputting said third address and said third read instruction; said receiving sequential address generator for providing a timing reference signal having a predetermined period and for outputting a fourth address and a fourth write instruction at a timing predetermined based on said reference signal; a data validity decision circuit for deciding in synchronism with said fourth address a validity of said second data in a predetermined address and outputting said write enable signal and said interrupt signal when valid; and a receiving dual port RAM responsive to said fourth address, said second data, said fourth write instruction and said write enable signal for writing said second data in an area of a second memory area assigned by said fourth address and responsive to said third address and said third read instruction for outputting a third data in an area of said second memory area assigned by said third address.

9. The package to package data transmission system claimed in claim 8, wherein said data validity decision circuit comprises means responsive to an instruction from said second microprocessor for stopping an output of said interrupt signal.

10. A package to package data transmission system for transferring digital data between at least two printed circuit boards or packages provided within a digital signal processing apparatus and mounting respectively thereon a plurality of electronic parts such as microprocessors, comprising:

(1) a first package including: a digital processing circuit for providing a first address, a first data and a first write instruction; a transmitting sequential address generator responsive to a timing reference signal for generating and providing a second address and a second read instruction at a timing predetermined on the basis of said timing reference signal; and a transmitting dual port RAM responsive to said first address, said first data and said first write instruction for writing said first data in an area of a first memory area assigned by said first address and responsive to said second address and said second read instruction for outputting a second data in an area of said first memory area assigned by said second address; and (2) a second package including: a microprocessor for providing a third address and a third read instruction; a receiving sequential address generator circuit for providing a timing reference signal having a predetermined period and generating and providing a fourth address and a fourth write instruction at a timing predetermined on the basis of said timing reference signal; and a receiving dual port RAM responsive to said fourth address, said second data and said fourth write instruction for writing said second data in an area of a second memory area assigned by said fourth address and responsive to said third address and said third read instruction for outputting a third data in an area of said second memory area assigned by said third address.

11. The package to package data transmission system claimed in claim 10, wherein said second package comprises: said microprocessor responsive to an interrupt signal for outputting said third address and said third read instruction; said receiving sequential address generator circuit for providing a timing reference signal having a predetermined period and for outputting a fourth address and a fourth write instruction at a timing predetermined based on said reference signal; a data validity decision circuit for deciding in synchronism with said fourth address a validity of said second data in a predetermined address and outputting said write enable signal and said interrupt signal when valid; and a receiving dual port RAM responsive to said fourth address, said second data, said fourth write instruction and said write enable signal for writing said second data in an area of a second memory area assigned by said fourth address and responsive to said third address and said third read instruction for outputting a third data in an area of said second memory area assigned by said third address.

12. The package to package data transmission system claimed in claim 11, wherein said data validity decision circuit comprises means responsive to an instruction from said microprocessor for stopping an output of said interrupt signal.

13. A package to package data transmission system for transferring digital data between at least two printed circuit boards or packages provided within a digital signal processing apparatus and mounting respectively thereon a plurality of electronic parts such as microprocessors, comprising:

(1) a first package including: a digital processing circuit for providing a first address, a first data and a first write instruction; a transmitting sequential address generator for providing a timing reference signal having a predetermined period and generating and providing a second address and a second read instruction at a timing predetermined on the basis of said timing reference signal; and a transmitting dual port RAM responsive to said first address, said first data and said first write instruction for writing said first data in an area of a first memory area assigned by said first address and responsive to said second address and said second read instruction for outputting a second data in an area of said first memory area assigned by said second address; and (2) a second package including: a microprocessor for providing a third address and a third read instruction; a receiving sequential address generator responsive to said timing reference signal for generating and providing a fourth address and a fourth write instruction at a timing predetermined on the basis of said timing reference signal; and a receiving dual port RAM responsive to said fourth address, said second data and said fourth write instruction for writing said second data in an area of a second memory area assigned by said fourth address and responsive to said third address and said third read instruction for outputting a third data in an area of said second memory area assigned by said third address.

14. The package to package data transmission system claimed in claim 13, wherein said second package comprises: said microprocessor responsive to an interrupt signal for outputting said third address and said third read instruction; said receiving sequential address generator circuit responsive to said timing reference signal for outputting a fourth address and a fourth write instruction at a timing predetermined based on said reference signal; a data validity decision circuit for deciding in synchronism with said fourth address a validity of said second data in a predetermined address and outputting said write enable signal and said interrupt signal when valid; and a receiving dual port RAM responsive to said fourth address, said second data, said fourth write instruction and said write enable signal for writing said second data in an area of a second memory area assigned by said fourth address and responsive to said third address and said third read instruction for outputting a third data in an area of said second memory area assigned by said third address.

15. The package to package data transmission system claimed in claim 14, wherein said data validity decision circuit comprises means responsive to an instruction from said microprocessor for stopping an output of said interrupt signal.

* * * * *